US011568183B2

(12) United States Patent
Ratner et al.

(10) Patent No.: US 11,568,183 B2
(45) Date of Patent: Jan. 31, 2023

(54) GENERATING SALIENCY MASKS FOR INPUTS OF MODELS USING SALIENCY METRIC

(71) Applicant: International Business Machines Corporation, Armonk, NY (US)

(72) Inventors: Vadim Ratner, Haifa (IL); Yoel Shoshan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 16/423,012

(22) Filed: May 26, 2019

(65) Prior Publication Data

US 2020/0372309 A1    Nov. 26, 2020

(51) Int. Cl.
*G06K 9/62* (2022.01)
*G06N 20/00* (2019.01)
*G06N 3/08* (2006.01)

(52) U.S. Cl.
CPC .......... *G06K 9/6268* (2013.01); *G06N 3/084* (2013.01); *G06N 20/00* (2019.01)

(58) Field of Classification Search
CPC .......... G06K 9/62; G06K 9/6268; G06N 3/08; G06N 20/00; G06N 3/084
See application file for complete search history.

(56) References Cited

U.S. PATENT DOCUMENTS

| 9,652,722 B1* | 5/2017 | Narsky | G06N 20/10 |
| 2010/0046837 A1* | 2/2010 | Boughorbel | G06T 7/50 |
| | | | 382/173 |
| 2018/0157661 A1 | 6/2018 | Zoldi et al. | |

FOREIGN PATENT DOCUMENTS

CN        108665277 A    10/2018

OTHER PUBLICATIONS

Robbins, Herbert et al., "A Stochastic Approximation Method," Ann. Math. Statist., 22(3):400-407, 09, 1951, University of North Carolina, pp. 8.
Heath, M. et al., "The Digital Database for Screening Mammography," In Proceedings of the 5th international workshop on digital mammography, pp. 212-218. Medical Physics Publishing, 2000, pp. 10.
Zeiler, Matthew D., "ADADELTA: An Adaptive Learning Rate Method," arXiv:1212.5701v1 [cs.LG], Dec. 22, 2012, Google Inc., New York University, pp. 6.
Simonyan, Karen et al., "Deep inside Convolutional Networks: Visualising Image Classification Models and Saliency Maps," arXiv:1312.6034v2 [cs.CV], Apr. 19, 2014, Visual Geometry Group, University of Oxford, pp. 8.

(Continued)

*Primary Examiner* — Tuan H Nguyen
(74) *Attorney, Agent, or Firm* — Barry D. Blount

(57) ABSTRACT

An example system includes a processor to receive an input and a model trained to classify inputs. The processor is to iteratively generate a perturbed input that optimizes a saliency metric including a classification term, a sparsity term, and a smoothness term, while keeping parameters of the model constant. The processor is to also detect that a predefined number of iterations is exceeded or a convergence of values of the perturbed input. The processor is to further generate a saliency mask based on a perturbation of the perturbed input in response to detecting the predefined number of iterations is exceeded or the convergence.

20 Claims, 6 Drawing Sheets

(56) References Cited

OTHER PUBLICATIONS

Goodfellow, Ian J. et al., "Explaining and Harnessing Adversarial Examples," Published as a conference paper at ICLR 2015; arXiv:1412.6572v3 [stat.ML], Mar. 20, 2015, Google Inc., Mountain View, CA, pp. 11.
Szegedy, Christian et al., "Rethinking the Inception Architecture for Computer Vision," arXiv:1512.00567v3 [cs.CV], Dec. 11, 2015, pp. 10.
Chang, Chun-Hao et al., "Interpreting Neural Network Classifications with Variational Dropout Saliency Maps," In Proc. NIPS, 2017, pp. 9.
Kingma, Diederik P. et al., "ADAM: A Method for Stochastic Optimization," Published as a conference paper at ICLR 2015; arXiv: 1412.6980v9 [cs.LG], Jan. 30, 2017, pp. 15.
Kurakin, Alexey et al., "Adversarial Examples in the Physical World," Workshop track—ICLR 2017; arXiv:1607.02533v4 [cs.CV], Feb. 11, 2017, pp. 14.
Dabkowski, Piotr et al., "Real Time Image Saliency for Black Box Classifiers," arXiv:1705.07857v1 [stat.ML], May 22, 2017, pp. 15.
Dong, Yinpeng et al., "Towards Interpretable Deep Neural Networks by Leveraging Adversarial Examples," arXiv:1708.05493v1 [cs.CV], Aug. 18, 2017, pp. 12.
Fong, Ruth C. et al., "Interpretable Explanations of Black Boxes by Meaningful Perturbation," arXiv:1704.03296v3 [cs.CV], Jan. 10, 2018, pp. 9.
Zhang, Chiliang et al., "Detecting Adversarial Perturbations with Saliency," arXiv:1803.08773v1 [cs.LG], Mar. 23, 2018, pp. 5.
Rey-De-Castro, Roberto et al., "Targeted Nonlinear Adversarial Perturbations in Images and Videos," arXiv:1809.00958v1 [cs.CV], Aug. 27, 2018, pp. 13.
Chalasani, Prasad et al., "Adversarial Learning and Explainability in Structured Datasets," arXiv:1810.06583v4 [cs.LG], Nov. 12, 2018, pp. 35.
Modas, Apostolos et al., "SparseFool: a few pixels make a big difference," arXiv:1811.02248v3 [cs.CV], Nov. 18, 2018, pp. 17.
Shoshan, Yoel et al., "Regularized adversarial examples for model interpretability," arXiv:1811.07311v2 [cs.LG], Nov. 21, 2018, pp. 8.

\* cited by examiner

GENERATING SALIENCY MASKS FOR INPUTS OF MODELS USING SALIENCY METRIC

BACKGROUND

The present techniques relate to analyzing machine learning models. More specifically, the techniques relate to determining saliency of regions of input for models.

SUMMARY

According to an embodiment described herein, a system can include processor to receive an input and a model trained to classify inputs. The processor can also further iteratively generate a perturbed input that optimizes a saliency metric including a classification term, a sparsity term, and a smoothness term, while keeping parameters of the model constant. The processor can also detect that a predefined number of iterations is exceeded or a convergence of values of the perturbed input. The processor can also further generate a saliency mask for the input based on a perturbation of the perturbed input in response to detecting the predefined number of iterations is exceeded or the convergence.

According to another embodiment described herein, a method can include receiving, via a processor, an input and a model trained to classify inputs. The method can further include iteratively generating, via the processor, a perturbed input by transforming a perturbation of the input to optimize a saliency metric including a classification term, a sparsity term, and a smoothness term. The method can also further include detecting, via the processor, that a predefined number of iterations is exceeded or a convergence of values of the perturbed input. The method can also include generating, via the processor, a saliency mask for the input by thresholding the transformed perturbation.

According to another embodiment described herein, a computer program product for generating saliency masks can include computer-readable storage medium having program code embodied therewith. The computer readable storage medium is not a transitory signal per se. The program code executable by a processor to cause the processor to receive an input and a model trained to classify inputs. The program code can also cause the processor to iteratively generate a perturbed input that optimizes a saliency metric including a classification term, a sparsity term, and a smoothness term, while keeping parameters of the model constant. The program code can also cause the processor to detect that a predefined number of iterations is exceeded or a convergence of values of the perturbed input. The program code can also cause the processor to generate a saliency mask for the input based on a perturbation of the perturbed input in response to detecting the predefined number of iterations is exceeded or the convergence.

DETAILED DESCRIPTION

Figure 1:
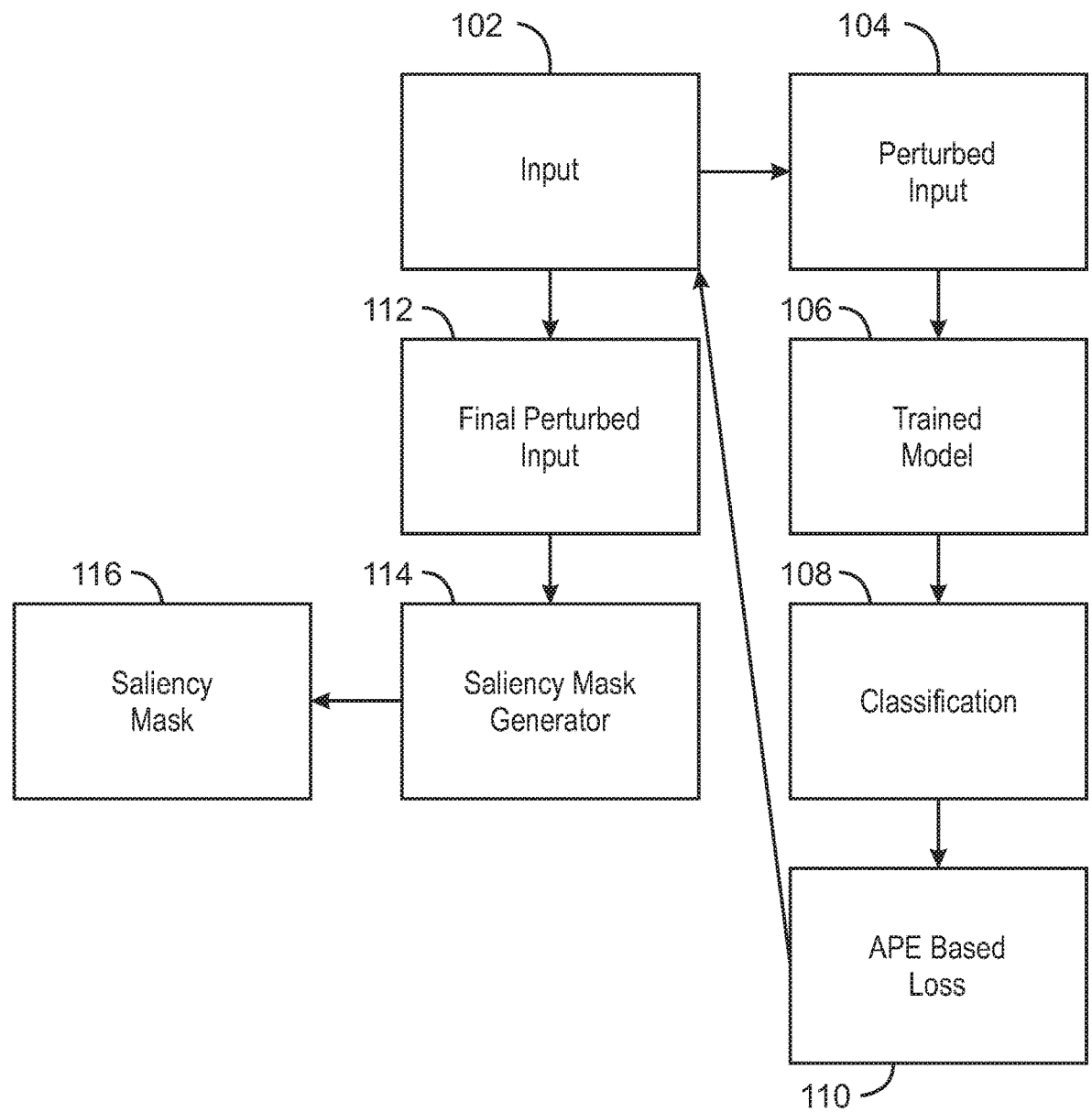
FIG. 1 is a block diagram of an example system for generating saliency masks for inputs of machine-learning models.

Machine learning models can be trained to perform classification of input data without any localization information, among other various trainable tasks. Localization information is information that indicates a location of a potential object in an image or other input data. However, such machine learning models may typically perform as black boxes. In other words, although the trained model may be able to output a classification of the input and a confidence score associated with the classification, the model may not provide additional explanatory information answering why the model made a given decision or why the model may have incorrectly classified an object.

Ground truth (GT) based metrics, by themselves, may not represent a good explanation of the performance of a model. Firstly, the model prediction behavior may be flawed to begin with. For example, if the model was trained using limited training data, then the model may be classifying an object based on an unrelated and unwanted factor that was present in the training data. On the other hand, there may be evidence outside the annotated GT object that may legitimately influence a model decision. GT based metrics are unable to take into account that such evidence may legitimately influence model decisions. Moreover, models may be trained using millions of trainable parameters. Thus, it may be very difficult to explain the behavior of a model by analyzing the parameters themselves.

According to embodiments of the present disclosure, saliency maps can be generated for inputs into a trained model. For example, a system can include a processor to receive an input and a model trained to classify inputs. The processor can iteratively generate an adversarial example, referred to herein as a perturbed input, that optimizes a saliency metric including a classification term, a sparsity term, and a smoothness term, while keeping parameters of the model constant. The processor can then detect that a predefined number of iterations is exceeded or a convergence of values in the perturbed input. Convergence as used herein refers to the settling of perturbed values on a particular set of perturbed values during training. The processor can then generate a saliency mask for the input based on a perturbation of the perturbed input in response to detecting the predefined number of iterations is exceeded or the convergence. For example, the processor can generate a saliency mask by thresholding values of a final absolute value of input perturbation at a predetermined threshold. For example, the predetermined threshold may be zero. The input perturbation is the delta between the original input and the perturbed input. A perturbation, as used herein, is a change in a value of the input to a value of the perturbed input. For example, the perturbation may be the change in value of a pixel from an input to the perturbed input. As one example, if a pixel has a value of 40 in the input and a value of 60 in the perturbed input, then the perturbation may have a value of 20. In some examples, the saliency mask may be a binary mask that indicates the location of input values associated with a perturbation that exceeds the threshold. Thus, embodiments of the present disclosure allow explanation that may reveal the weaknesses of a model. In addition, the techniques described herein may be used to locate objects being classified by a model based on the saliency maps. While the analyzed network is not exposed to localization information, the techniques described herein extract meaningful local cues.

With reference now to FIG. 1, a block diagram shows an example system for generating saliency masks for inputs of machine-learning models. The example system is generally referred to by the reference number 100. The system 100 of FIG. 1 includes an input 102. For example, the input may be an image containing an object to be classified. The input may be lacking any localization information for the object. The input 102 is shown being perturbed to generate a perturbed input 104. For example, the one of more values of the input 102 may be modified, or perturbed. As one example, the modified values may be pixel values. The system 100 also includes a trained model 106 receive the perturbed input 104. In various examples, the trained model 106 may initially receive the input 102. The trained model 106 may have been trained on training input for classifying various classes of objects. The trained model 106 is shown generating a classification 108 based on the perturbed input 104. The system 100 also includes an Adversarial Perturbative Explanation (APE) based loss 110 communicatively coupled to the trained model 106. The APE based loss 110 can be implemented using any gradient based optimizer, such as a stochastic gradient descent (SGD) optimizer, the Adaptive Moment Estimation (Adam) optimizer (released 2015), or the ADADELTA (released 2012) optimizer. For example, the loss 112 may be back propagated through the trained model 106, which remains unchanged, and used to update the perturbed input 104. The updated perturbed input 104 may then be processed through the trained model 106, resulting in a new APE based loss 110, and so forth. A final perturbed input 112 is generated by transforming the perturbation in a final iteration. For example, the final perturbed input 112 may thus be the value of the perturbed input 104 in a final iteration of back propagation of the APE based loss 110. The system 100 includes a saliency mask generator 114 communicatively coupled to the trained model 106 to receive the final perturbed input 112. The saliency mask generator 114 is to generate a saliency mask 116 for an input 102 based on the final perturbed input 112.

The saliency mask 116 may be used to analyze the classification 108 generated by the trained model 106. For example, the saliency mask 116 may indicate areas of an image that contributed to the classification of input 102 as belonging to a particular class. In various examples, the indicated areas of the saliency mask 116 may also be used to locate an object in the input 102 associated with the classification 108. Given the trained model 106, an input 102, and a model prediction or classification 108 based on the given input, the saliency mask 116 shows which different parts of the input influenced the classification 108.

Still referring to FIG. 1, a saliency metric may be used as the APE based loss110 to generate the perturbed input. In various examples, the saliency metric may be an adversarial perturbative explanation (APE) metric. Perturbation based explanation describes regions that affect the decision of a model, given a modified (perturbed) input. As used herein, a perturbation is a delta between an original input and a perturbed version of the input. In various examples, the specific type of APE metric used may depend on whether a smallest destroying region (SDR) or smallest sufficient region (SSR) is used. An $APE_D$ metric refers to an APE metric that suppresses class evidence when an SDR is used. An $APE_S$ metric refers to an APE metric that maintains class evidence when SSR is used.

In various examples, an $APE_D$ metric may be calculated as follows. Given a trained model M 106, an input I 102, a perturbed input $\tilde{I}$, and class index i, then $\hat{I}$ may be defined to be the clipped version of $\tilde{I}$. For example, $\hat{I}$ may be $\tilde{I}$ constrained to remain within a valid input value range. Binarization may be defined using the Equation:

$$B(f)(x) = \begin{cases} 1 & f(x) \neq 0 \\ 0 & f(x) = 0 \end{cases} \qquad \text{Eq. 1}$$

A saliency metric $APE_D$ may be composed of a classification term, a sparsity term, and a smoothness term. The classification term can be calculated using the Equation:

$$E_c(\hat{I}) = M(\hat{I})_i \qquad \text{Eq. 2}$$

where $M(\hat{I})_i$ is the prediction, or classification, of the model given input $\hat{I}$ with respect to class index i. The classification term expresses the destructiveness of the saliency region with respect to class i. Destructiveness as used herein refers to the amount of change in the classification with regards to a class i given a change in the saliency region. The classification term may be included to make the explanatory value of the resulting saliency mask as simple as possible. The sparsity term may be calculated using the Equation:

$$E_s(I,\hat{I}) = L_0(I-\hat{I})_i \qquad \text{Eq. 3}$$

with $L_0$ being the $L_0$ norm (i.e. count of non-zero elements in the input). The smoothness term may be calculated using the Equation:

$$E_r(I,\hat{I}) = TV(B(I-\hat{I}))_i \qquad \text{Eq. 4}$$

Thus, the overall $APE_D$ saliency metric, including the classification term, the sparsity term, and the smoothness term may be calculated using the Equation:

$$APE_D = \frac{1}{N} L_0(I-\hat{I})_i + \frac{1}{N} TV(B(I-\hat{I}))_i + M(\hat{I})_i \qquad \text{Eq. 5}$$

where N is the number of elements on I.

Similarly, a saliency metric $APE_S$ may be calculated and used to maintain class evidence when a smallest sufficient region is used. Similarly to the SDR saliency metric $APE_D$, $\hat{I}$ may be defined to be the clipped version of $\tilde{I}$, constraining it to remain within valid input value range. The classification term for the $APE_S$ saliency metric can be calculated using the Equation:

$$E_C(\hat{I}) = |M(\hat{I})_i - M(I)_i| \qquad \text{Eq. 6}$$

where $M(\hat{I})_i$ is the prediction of the model given input $\hat{I}$ with regard to class index i. This classification term expresses how well the original model classification is preserved. The sparsity term for the $APE_S$ saliency metric may be calculated using the Equation:

$$E_s(I,\hat{I}) = L_0(1 - B(I - \hat{I})) \qquad \text{Eq. 7}$$

The smoothness term for the $APE_S$ saliency metric may be calculated using the Equation:

$$E_r(I,\hat{I}) = TV(1-B(I-\hat{I})) \quad \text{Eq. 8}$$

Thus, the overall $APE_D$ saliency metric, including the classification term, the sparsity term, and the smoothness term may be calculated using the Equation:

$$APE_S = \frac{1}{N}L_0(1-B(I-\hat{I})) + \frac{1}{N}TV(1-B(I-\hat{I})) + |M(\hat{I})_i - M(I)_i| \quad \text{Eq. 9}$$

where N is the number of elements on I. In various examples, weights may also be provided for each of the terms in either of the example saliency metrics. Coefficients may be defined to provide different weights to each of the terms. For example, a weighted $APE_D$ saliency metric may be calculated using the Equation:

$$APE_D = \alpha_{sp}\frac{1}{N}L_0(I-\hat{I})_i + \alpha_{sm}\frac{1}{N}TV(B(I-\hat{I}))_i + \alpha_{cl}M(\hat{I})_i \quad \text{Eq. 10}$$

where $\alpha_{sp}$, $\alpha_{sm}$, and $\alpha_{cl}$ are the sparsity, smoothness, and classification weights, respectively. As one example, in the case of a classifier that classifies malignant tumors in images, the weights may have values of $\alpha_{sp}=1$, $\alpha_{sm}=1$, and $\alpha_{cl}=1$. In various examples, including different domains and tasks, different metric coefficients may be used. For example, if in the examined domain or task, it is known in advance that objects are relatively large, then $\alpha_{sm}$ can be increased and $\alpha_{sp}$ can also possibly be reduced. Such modification of the weights may favor smooth connected component explanations and discourage explanations that are too sparse.

Still referring to FIG. 1, the APE based APE based 110 may thus be used to optimize the perturbed output with respect to at least one of the saliency metrics discussed above. As one example, a case of medical imaging, the APE based loss 110 may be based on the $APE_D$ saliency metric because it explores less drastic modifications to the input 102 and allows the trained model 106 to consider a larger context.

In the example of a trained model 106 trained to classify medical imaging input 102 as either containing or not containing malignant tumors, given perturbed output Î binarization can be approximated using the Equation:

$$B(I-\hat{I})(x) \approx S(x) \equiv \frac{2}{1+\exp(-\gamma(|I(x)-\hat{I}(x)|-\varepsilon))} - 1 \quad \text{Eq. 11}$$

where the equation approximates a smoothed step function that receive negative values below ε. γ and ε are variables that may be set to γ=30 and ε=0.01 for the example of medical imaging input 102. An optimization problem may then be used to find a value of Î that minimizes the $APE_D$ saliency metric. As one example, Î may be initialized to I. Then, Î is iteratively modified using the gradient of the loss with respect to the input 102, while keeping the trained parameters of the trained model 106 constant. In various examples, any gradient based optimizer may be used, including, for example, SGD, Adam, AdaDelta, among other suitable gradient based optimizers. For the example of the medical imaging input 102, the Adam optimizer may be used. In the example of using an SGD optimizer, the SGD update step may be represented using the Equation:

$$\Delta \hat{I} = -\delta \frac{\partial E}{\partial \hat{I}_k} \quad \text{Eq. 12}$$

where δ is a step size or a learning rate, and E is the loss. The loss E may be a smooth version of the saliency metric, and can be calculated using the Equation:

$$E(I,\hat{I}) = M(\hat{I})_i + \alpha \text{sum}(S) + \beta TV(S) \quad \text{Eq. 13}$$

where the first term of Eq. 13 reduces classification value of class i, the second term of Eq. 13 approximates the size of support of P with two differences. First, as described previously, the second term is smooth with respect to the approximation of the support of the perturbation S. Secondly, very small values of the perturbation result in negative values of S, decreasing the overall value of the second member. This may encourage close-to-zero perturbations over most of the image. This may also be useful later when the saliency mask is generated. The third term encourages smoothness of S, preferring continues regions of non-zero values over scattered individual elements. For example, the individual elements may be pixels in the case of images.

In various example, on each iteration, after computing the update step as Eq. 12, Î may be constrained to remain in the original applicable values range which I is sampled from, by clipping the values of Î. After either completing a defined number of iterations, or a when reaching convergence, the saliency mask can be generated by thresholding S at a predetermined threshold, such as zero, as shown in the following Equation:

$$sal(x) = \begin{cases} 1 & S(x) \geq 0 \\ 0 & S(x) < 0 \end{cases} \quad \text{Eq. 14}$$

Thus, all negative elements of S to may be set to "0", and all positive elements of S may be set to "1."

In various examples, the generated saliency mask may then be output. For example, the saliency mask 116 may be provided together with the classification 108.

However, further zeroing out some regions of P may increase the classification term, thus increasing the overall $APE_D$ score. Therefore, in some examples, a second phase may be introduced in which the smallest achievable classification probability is found for class i, given that perturbations are only allowed within the mask derived in Eq. 14.

In the second phase, small perturbations of the input may also affect classification (and classification term), and eliminating those perturbations in Eq. 14 may increase overall loss. For example, the small perturbations may be perturbations having a value less than ε. For example, ε may be some very small constant as compared to a highest value possible for an input. As one examples, in neural networks the input may be normalized to be in the range of [0 . . . 1] or [−1 . . . 1], so one possible choice of an epsilon may be 0.001, or even 0.0001. Phase two of the algorithm may ensure that classification loss remains small for the derived saliency mask. The purpose of the second phase may be to make sure that the classification term is minimized while allowing perturbations only within the mask derived in Eq. 14. For this purpose, a perturbed image may be found, similarly to Eq. 12, that is non-zero only inside the mask, starting with Ĭ=I:

$$\Delta \check{I}(x) = -\delta \frac{\partial E}{\partial \check{I}_k} sal(x) \qquad \text{Eq. 15}$$

However, in some examples, only the classification term may be minimized in the second phase, as demonstrated in the Equation:

$$E(\check{I}) = M(\check{I})_i \qquad \text{Eq. 16}$$

Thus, in the second phase, both the sparsity and smoothness terms may be dropped to allow non-regulated changes to occur within the mask regions, compensating for omitting out-of-mask changes.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional types or instances of input, models, iterations, or additional saliency masks, etc.).

Figure 2:
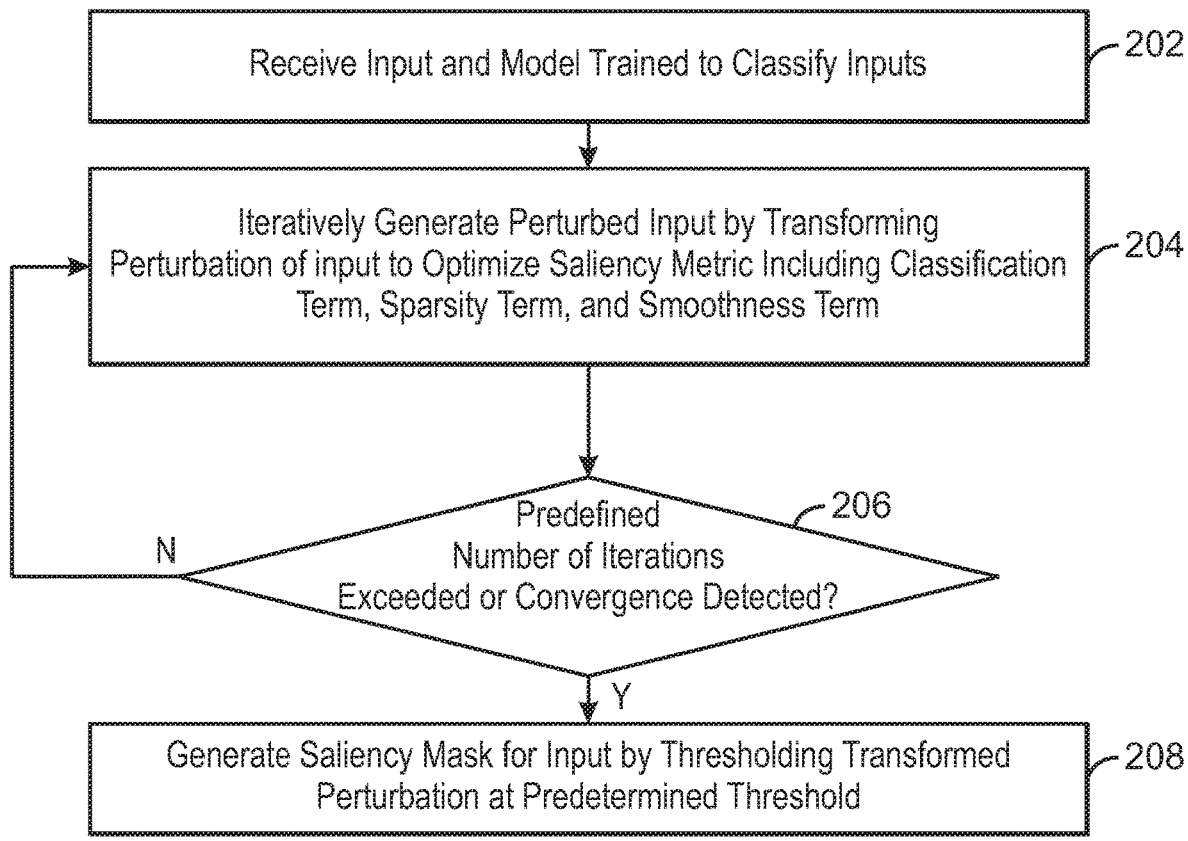
FIG. 2 is a block diagram of an example method that can generate saliency masks for inputs of machine-learning models.

FIG. 2 is a process flow diagram of an example method that can generate saliency masks for inputs of machine-learning models. The method 200 can be implemented with any suitable computing device, such as the computing device 300 of FIG. 3 or the system 100 of FIG. 1.

At block 202, an input and a model trained to classify inputs is received. For example, the input may be an image to be classified. As one example, the image may be classified as including a malignant lesion or not having a malignant lesion. In various examples, other types of input to be classified may be received. In some examples, the machine-learning model may be an artificial neural network.

At block 204, a perturbed input is iteratively generated by transforming a perturbation of the input to optimize a saliency metric including a classification term, a sparsity term, and a smoothness term. For example, the perturbed input may be iteratively modified based on a gradient of a loss with respect to a previous perturbed input while holding parameters of the model constant. In various examples, a loss is back propagated through the trained model to transform the perturbation of the input. In some examples, iteratively modifying the perturbed input includes clipping values of the perturbed input to constrain the perturbed input within a range of original applicable values from which the input is sampled. In some examples, the perturbed input may be iteratively modified to generate an improved perturbed input with non-zero values only inside the saliency mask. The improved perturbed input may reduce the classification term.

At block 206, a determination is made as to whether a predefined number of iterations is exceeded or a convergence is detected. The convergence may be a convergence of the values of the perturbed input. For example, convergence may be detected when the perturbed values of a perturbed input have changed less than a threshold amount. If a predefined number of iterations is exceeded or a convergence is detected, then the method may proceed at block 208. If a predefined number of iterations is not exceeded and a convergence is not detected, then the method may proceed at block 204.

At block 208, a saliency mask is generated for the input by thresholding the transformed perturbation at a predetermined threshold. For example, the transformed perturbation may be thresholded at a value of zero. In the case of an image, the saliency mask may be a binary mask that indicates perturbed pixels of the final perturbed input image with a perturbation exceeding the threshold. In some examples, the saliency mask may be generated by thresholding the perturbation of the improved perturbed input at the predetermined threshold.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method may also classify the input via the model and providing the saliency mask with a classification of the input. In some examples, the method can also locate an object associated with a classification of the input in the input based on the saliency mask.

Figure 3:
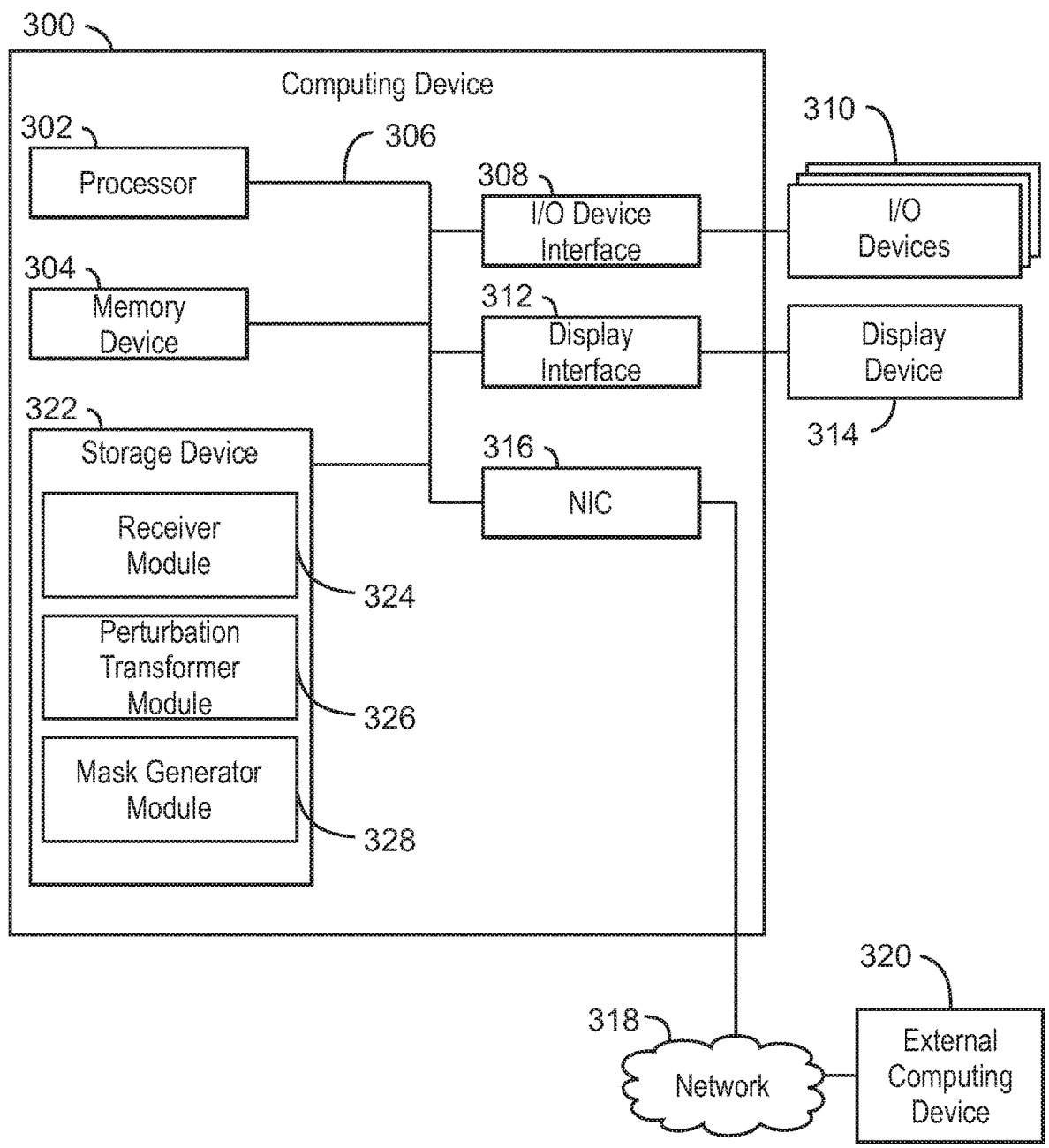
FIG. 3 is a block diagram of an example computing device that can generate saliency masks for inputs of machine-learning models.

FIG. 3 is block diagram of an example computing device that can generate saliency masks for inputs of machine-learning models. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver module 324, a perturbation transformer module 326, and a mask generator module 328. The receiver module 324 can receive an input and a model trained to classify inputs. For example, the input may be an image to be classified. In some examples, the model may be a machine-learning model, such as an artificial neural network. As one example, the image may be classified as including a malignant lesion or not having a malignant lesion. The perturbation transformer module 326 can iteratively generate a perturbed input based on the input that reduces a saliency metric including a classification term, a sparsity term, and a smoothness term, while keeping parameters of the model constant. For example, the perturbation transformer module 326 can iteratively modify the perturbed input based on a gradient of a loss with respect to a previous perturbed input while holding parameters of the model constant. In various examples, the saliency metric includes an adversarial perturbative explanation metric based on smallest sufficient region or smallest destroying region. In some examples, the perturbed input is generated using a loss function that is an approximated version of the saliency metric. The classification term represents a destructiveness of a saliency region with respect to an object class. The sparsity term is to reduce the total number of values changed in the perturbed input relative to the input. The smoothness term is to increase clustering of components in the saliency mask. The mask generator module 328 can detect that a predefined number of iterations is exceeded or a convergence of values of the perturbed input. The mask generator module 328 can generate a saliency mask for the input based on a perturbation of the perturbed input in response to detecting the predefined number of iterations is exceeded or the convergence. For example, the mask generator module 328 can generate a saliency mask by thresholding a perturbation of a final perturbed input at a predetermined threshold. For example, the predetermined threshold may be zero. In some examples, mask generator module 328 can transform a perturbation from the input and threshold the transformed perturbation to generate a binary saliency mask.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver module 324, the perturbation transformer module 326, and the mask generator module 328 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver module 324, perturbation transformer module 326, and mask generator module 328 can be implemented with logic, wherein the logic, as referred to herein, can include any suitable hardware (e.g., a processor, among others), software (e.g., an application, among others), firmware, or any suitable combination of hardware, software, and firmware.

In some scenarios, the techniques described herein may be implemented in a cloud computing environment. As discussed in more detail below in reference to at least FIGS. 3-5, a computing device configured to generate saliency masks for inputs of models may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
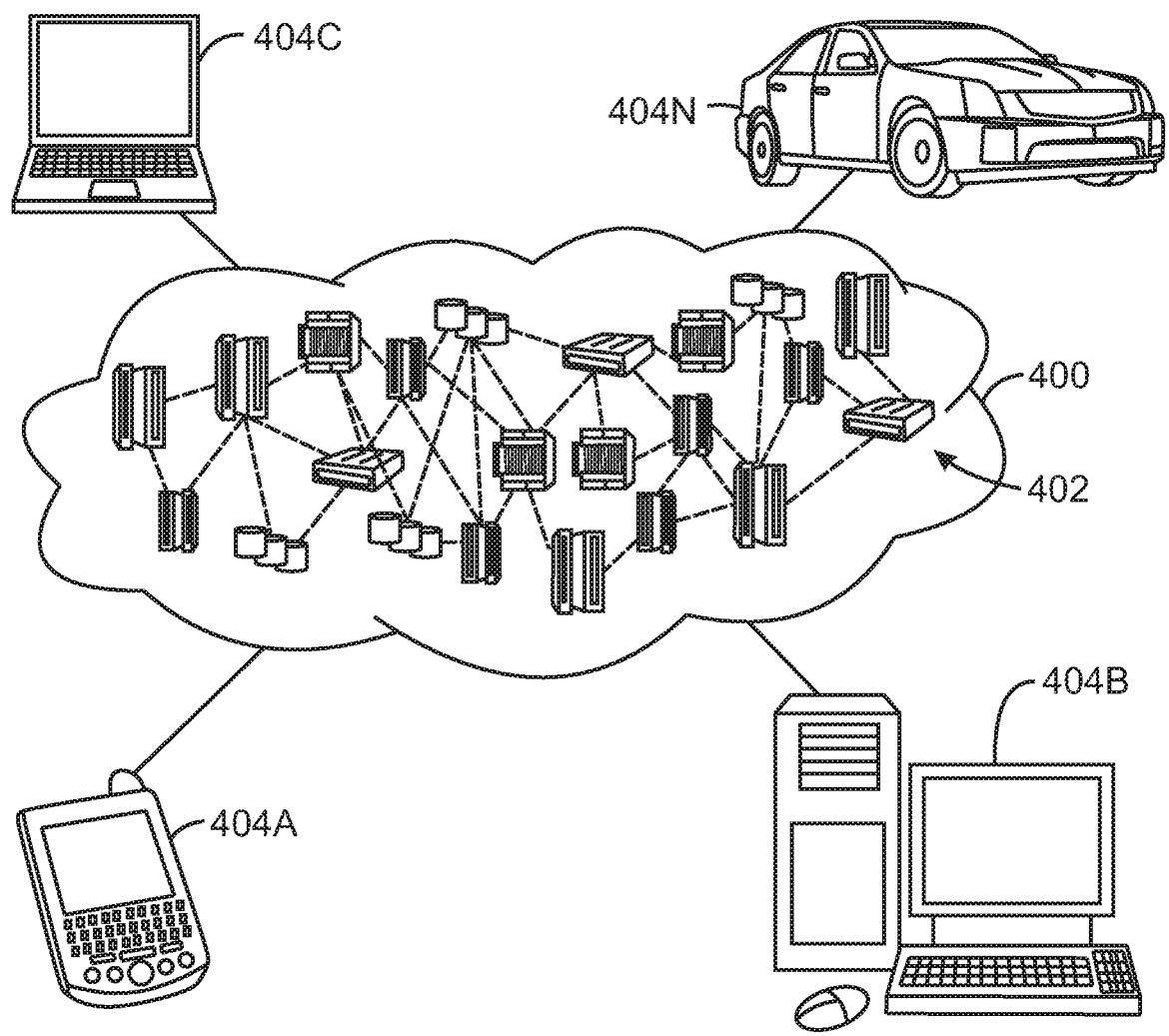
FIG. 4 is a process flow diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
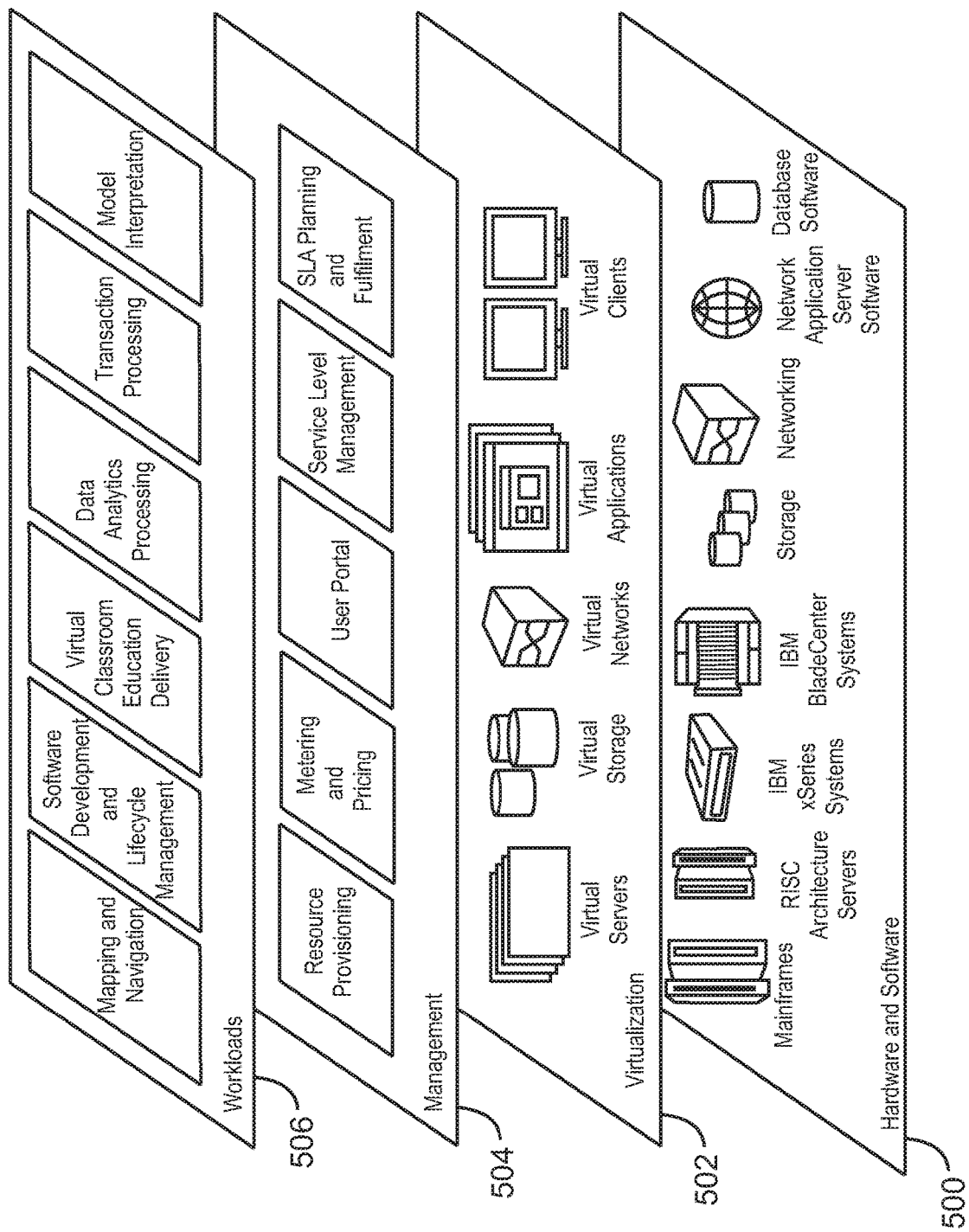
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and model interpretation.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
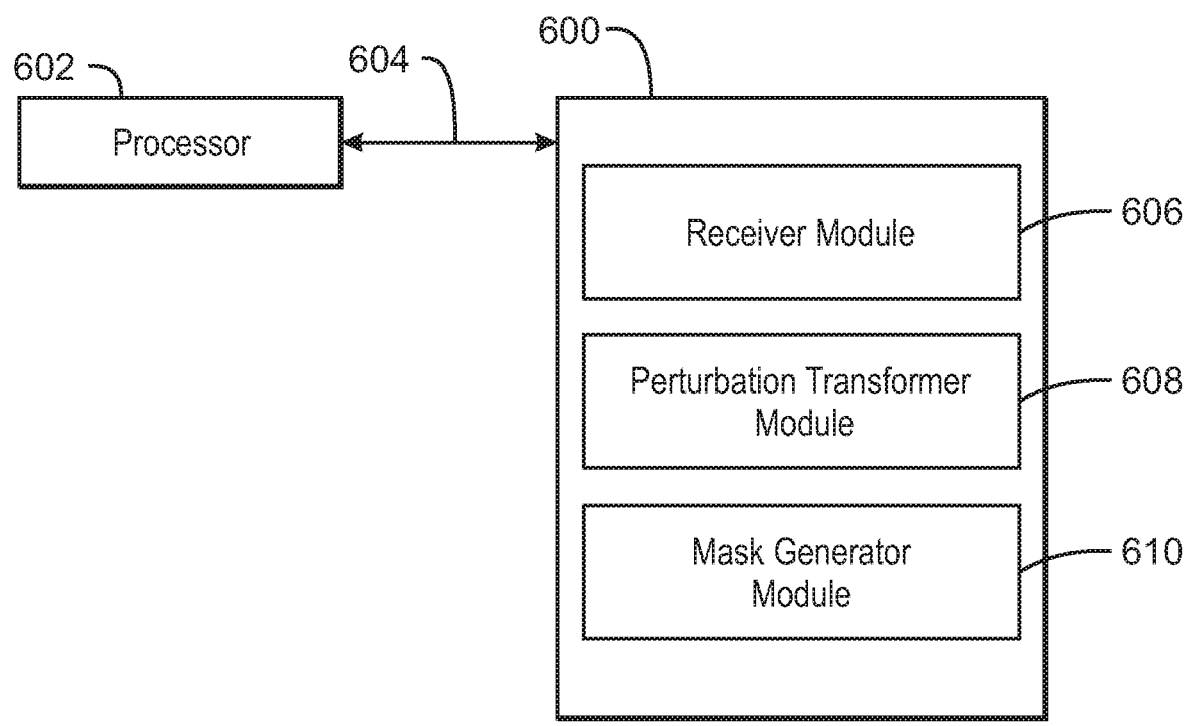
FIG. 6 is an example tangible, non-transitory computer-readable medium including code to generate saliency masks for inputs of machine-learning models.

Referring now to FIG. 6, a block diagram is depicted of an example tangible, non-transitory computer-readable medium 600 including code to generate saliency masks for inputs of machine-learning models. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a receiver module 606 includes code to receive an input and a model trained to classify inputs. For example, the input may be an image and the model may be trained to classify images as including one or more classes of objects. A perturbation transformer module 608 includes code to iteratively generate a perturbed input that optimizes a saliency metric including a classification term, a sparsity term, and a smoothness term, while keeping parameters of the model constant. For example, the perturbation transformer module 608 can include code to cause the perturbed input to be iteratively modified based on a gradient of a loss with respect to a previous perturbed input, while holding parameters of the model constant. The perturbation transformer module 608 further includes code to clip values of the perturbed input to constrain the perturbed input within a range of original applicable values from which the input is sampled. In some examples, the perturbation transformer module 608 also includes code to further iteratively generate an improved perturbed input with non-zero values only inside the saliency mask, the improved perturbed input to reduce the classification term, and generate the saliency mask by thresholding values of the improved perturbed input at zero. A mask generator module 610 includes code to detect that a predefined number of iterations is exceeded or a convergence of values of the perturbed input. The mask generator module 610 also includes code to generate a saliency mask for the input based on a perturbation of the perturbed input in response to detecting the predefined number of iterations is exceeded or the convergence. For example, the mask generator module 610 may include code to generate a saliency mask by thresholding a perturbation of a final perturbed input at zero. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive an input and a model trained to classify inputs;
iteratively generate a perturbed input that optimizes a saliency metric including a classification term that measures an amount of change in a classification of the model with regards to a class given a change in the input, a sparsity term, and a smoothness term, while keeping parameters of the model constant;
detect that a predefined number of iterations is exceeded or a convergence of values of the perturbed input; and
generate a saliency mask for the input based on a perturbation of the perturbed input in response to detecting the predefined number of iterations is exceeded or the convergence.

2. The system of claim 1, where the perturbation from the input is transformed and thresholded to generate a binary saliency mask.

3. The system of claim 1, wherein the classification term represents destructiveness of a saliency region with respect to an object class.

4. The system of claim 1, wherein the sparsity term is to reduce the total number of values changed in the perturbed input relative to the input.

5. The system of claim 1, wherein the smoothness term is to increase clustering of components in the saliency mask.

6. The system of claim 1, wherein the perturbed input is generated using a loss function that is an approximated version of the saliency metric.

7. The system of claim 1, wherein the saliency metric comprises an adversarial perturbative explanation metric based on smallest sufficient region or smallest destroying region.

8. A computer-implemented method, comprising:
receiving, via a processor, an input and a model trained to classify inputs;
iteratively generating, via the processor, a perturbed input by transforming a perturbation of the input to optimize a saliency metric including a classification term that measures an amount of change in a classification of the model with regards to a class given a change in the input, a sparsity term, and a smoothness term;
detecting, via the processor, that a predefined number of iterations is exceeded or a convergence of values of the perturbed input; and
generating, via the processor, a saliency mask for the input by thresholding the transformed perturbation.

9. The computer-implemented method of claim 8, wherein iteratively generating the perturbed input comprises clipping values of the perturbed input to constrain the perturbed input within a range of original applicable values from which the input is sampled.

10. The computer-implemented method of claim 8, comprising generating an improved perturbed input with non-zero values only inside the saliency mask, the improved perturbed input to optimize the classification term, and generating the saliency mask by thresholding an updated transformed perturbation of the improved perturbed input.

11. The computer-implemented method of claim 8, wherein iteratively generating the perturbed input comprises iteratively modifying the perturbed input based on a gradient of a loss with respect to a previous perturbed input of the adversarial example generator while holding parameters of the model constant.

12. The computer-implemented method of claim 8, comprising classifying the input via the model and providing the saliency mask with a classification of the input.

13. The computer-implemented method of claim 8, comprising locating an object associated with a classification of the input in the input based on the saliency mask.

14. The computer-implemented method of claim 8, wherein iteratively generating the perturbed input comprises back propagating a loss through the trained model.

15. A computer program product for generating saliency masks, the computer program product comprising a computer-readable storage medium having program code embodied therewith, wherein the computer readable storage medium is not a transitory signal per se, the program code executable by a processor to cause the processor to:
receive an input and a model trained to classify inputs;
iteratively generate a perturbed input that optimizes a saliency metric including a classification term that measures an amount of change in a classification of the model with regards to a class given a change in the input, a sparsity term, and a smoothness term, while keeping parameters of the model constant;
detect that a predefined number of iterations is exceeded or a convergence of values of the perturbed input; and
generate a saliency mask for the input based on a perturbation of the perturbed input in response to detecting the predefined number of iterations is exceeded or the convergence.

16. The computer program product of claim 15, further comprising program code executable by the processor to clip values of the perturbed input to constrain the perturbed input within a range of original applicable values from which the input is sampled.

17. The computer program product of claim 15, further comprising program code executable by the processor to further iteratively generate an improved perturbed input with non-zero values only inside the saliency mask, the improved perturbed input to reduce the classification term, and generate the saliency mask by thresholding values of the improved perturbed input at a predetermined threshold.

18. The computer program product of claim 15, further comprising program code executable by the processor to iteratively modify the perturbed input based on a gradient of a loss with respect to a previous perturbed input while holding parameters of the model constant.

19. The computer program product of claim 15, further comprising program code executable by the processor to classify the input via the model and provide the saliency mask with a classification of the input.

20. The computer program product of claim 15, further comprising program code executable by the processor to locate an object associated with a classification of the input in the input based on the saliency mask.

* * * * *